United States Patent
Chuba et al.

(10) Patent No.: US 7,213,826 B2
(45) Date of Patent: May 8, 2007

(54) ONE-PIECE COMPOSITE RUNNING BOARD AND BRACKET SYSTEM

(75) Inventors: Charles John Chuba, Farmington Hills, MI (US); Thomas Frederick Hishon, Clawson, MI (US); Christopher John Kuntze, Clarkson, MI (US); Jonathan L. Sheppard, Clawson, MI (US)

(73) Assignee: Decoma International Inc., Concord, Ontario (CA)

( * ) Notice: Subject to any disclaimer, the term of this patent is extended or adjusted under 35 U.S.C. 154(b) by 222 days.

(21) Appl. No.: 10/492,375

(22) PCT Filed: Oct. 21, 2002

(86) PCT No.: PCT/CA02/01568

§ 371 (c)(1),
(2), (4) Date: Apr. 12, 2004

(87) PCT Pub. No.: WO03/033304

PCT Pub. Date: Apr. 24, 2003

(65) Prior Publication Data

US 2004/0239068 A1    Dec. 2, 2004

(51) Int. Cl.
B60R 3/00    (2006.01)
(52) U.S. Cl. .................. 280/164.1; 280/166; 280/163; 280/164.2; 280/169
(58) Field of Classification Search ............. 280/164.1, 280/166, 163, 164.2, 169
See application file for complete search history.

(56) References Cited

U.S. PATENT DOCUMENTS

| | | | |
|---|---|---|---|
| 1,745,790 A | 2/1930 | Geyer | |
| 1,860,654 A | 3/1932 | Cavanagh | |
| 2,132,471 A | 10/1938 | Hoffman | |
| 4,266,792 A | 5/1981 | Sanders et al. | |
| 5,286,049 A * | 2/1994 | Khan | 280/163 |
| 6,050,579 A | 4/2000 | Selland et al. | |
| 6,135,472 A | 10/2000 | Wilson | |
| 6,139,089 A | 10/2000 | Troyer | |
| 6,173,979 B1 * | 1/2001 | Bernard | 280/163 |
| 6,203,040 B1 | 3/2001 | Hutchins | |
| 6,409,193 B2 * | 6/2002 | Bernard | 280/163 |
| 6,412,799 B1 * | 7/2002 | Schrempf | 280/163 |
| 6,513,821 B1 * | 2/2003 | Heil | 280/169 |

(Continued)

FOREIGN PATENT DOCUMENTS

JP    09 071186 A    3/1997

(Continued)

Primary Examiner—J. Allen Shriver
Assistant Examiner—Cynthia F. Collado
(74) Attorney, Agent, or Firm—Clark Hill PLC

(57) ABSTRACT

An integrally molded, one-piece running board (10) is adapted for attachment to a motor vehicle (14). The running board (10) includes a stepping platform (16) having an upper surface (18) and a lower surface (20) extending along a longitudinal axis and laterally between outer and inner edges. A plurality of mounting projections (32) is molded with and extend laterally from the inner edge. The plurality of mounting projections (32) is securable to the motor vehicle for holding the stepping platform (16) thereagainst. A plurality of reinforcing ribs (52) extends between the lower surface (20) of the stepping platform (16) and the plurality of mounting projections (32) to support the running board as a downward force is applied to the upper surface of the stepping platform (16).

19 Claims, 3 Drawing Sheets

U.S. PATENT DOCUMENTS

| | | | |
|---|---|---|---|
| 6,536,790 B1 * | 3/2003 | Ojanen | 280/163 |
| 6,581,946 B2 * | 6/2003 | Lund et al. | 280/163 |
| 6,726,230 B2 * | 4/2004 | Weir | 280/163 |
| 2003/0006576 A1 * | 1/2003 | Lanoue et al. | 280/163 |

FOREIGN PATENT DOCUMENTS

| | | |
|---|---|---|
| WO | WO 00 21792 A | 7/2002 |

* cited by examiner

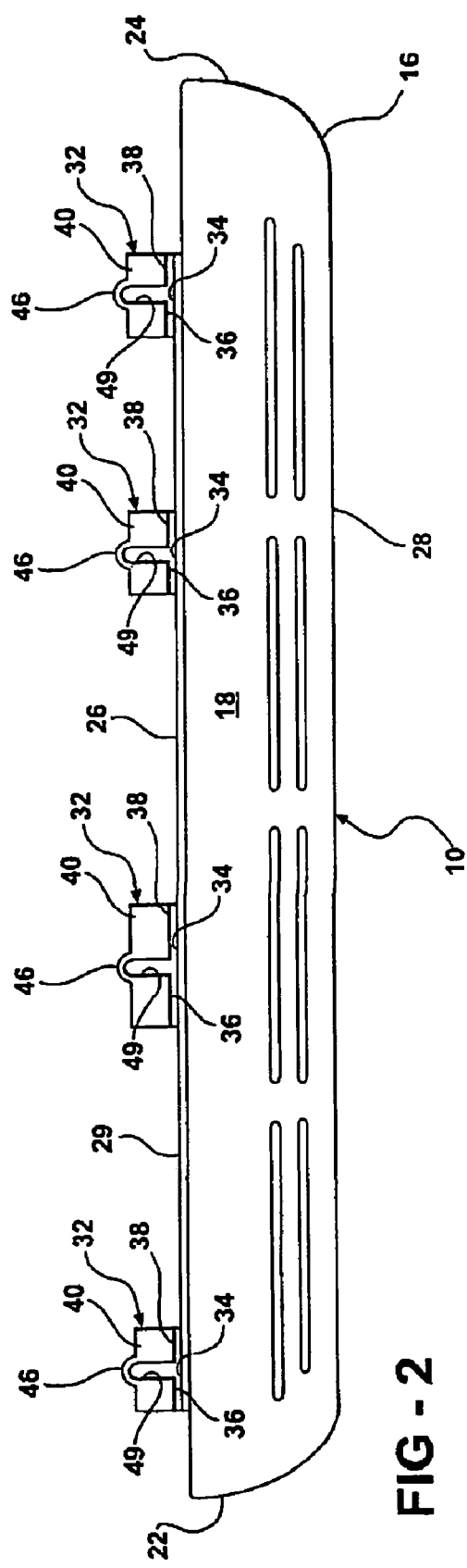
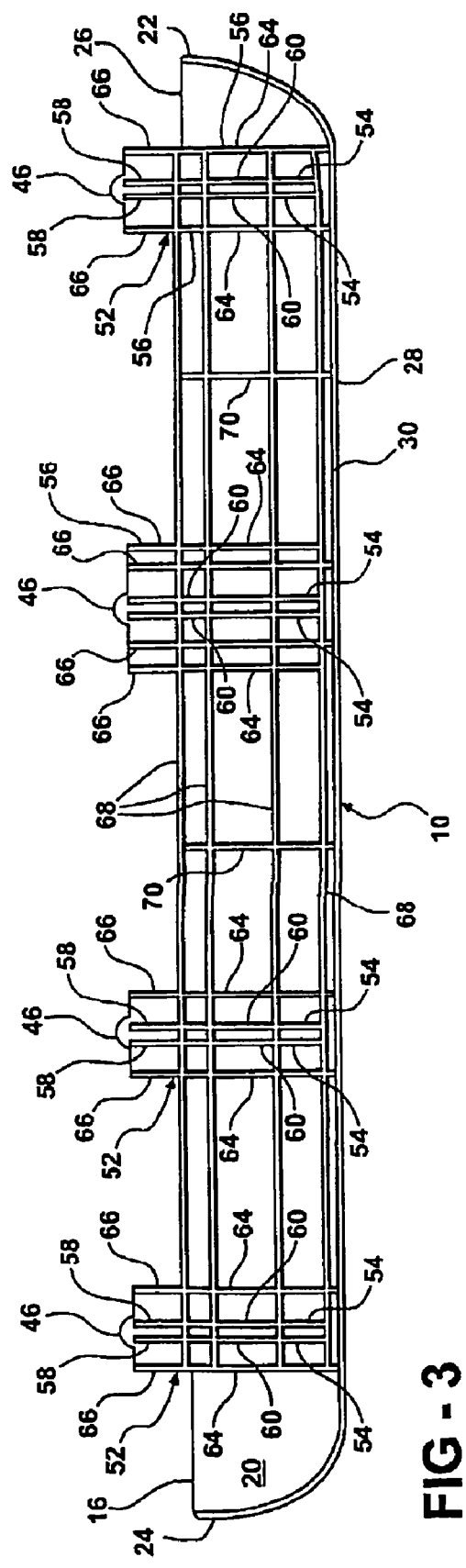
FIG-2
FIG-3

ONE-PIECE COMPOSITE RUNNING BOARD AND BRACKET SYSTEM

FIELD OF THE INVENTION

This invention relates to a running board for a motor vehicle. More particularly, the invention relates to a one-piece, integrally molded running board that is adapted to be attached to a side of a motor vehicle.

DESCRIPTION OF THE RELATED ART

Running boards are a popular accessory for motor vehicles having a high ground clearance, such as sport-utility vehicles, pick-up trucks, and minivans. The running boards assist individuals in entering and exiting the motor vehicle by allowing individuals to use the running board as a step. Typically, running boards are assemblies made up of multiple components. For example, the running board generally includes a stepping platform extending longitudinally alongside the motor vehicle for supporting an individual thereon, and a mounting means for holding the stepping platform against the motor vehicle.

Previous running boards were made exclusively from metal in order to resist downward forces applied to the stepping platform. More recently, with the advent of composite materials, manufacturing part of the running board from plastic has become common. Running boards having at least one component molded from a composite material are lighter in weight and are more cost-effective compared to running boards made exclusively from metal.

U.S. Pat. No. 1,745,790 to Geyer discloses a molded rubber running board for a motor vehicle. The running board includes longitudinally extending depending ribs along its side edges. One or more strengthening ribs depending from a web portion or lower surface are positioned between the longitudinally extending depending ribs. The running board also includes a pressed sheet metal reinforcing member, which is insert molded within the running board during the formation of the running board in a rubberized vulcanizing mold. Stiffening flanges extending from the reinforcing member reinforce the longitudinally extending depending ribs as well as the strengthening ribs. Although the rubber running board is molded, there remains a metal component therein, which adds undesirable weight to the running board. In addition, a mounting means must be utilized to secure the running board alongside a motor vehicle.

Commonly owned U.S. Pat. No. 6,412,799 discloses a one-piece running board providing a light weight design. However, the running board still requires separate mounting brackets for attaching the running board onto the vehicle.

Thus, there remains a need for a one-piece running board that may be formed exclusively from composite materials and, at the same time, retains the requisite strength to support an individual thereon.

SUMMARY OF THE INVENTION

According to one aspect of the invention, a one-piece, integrally molded running board is adapted to be attached to a motor vehicle. The running board includes a stepping platform having an upper surface and a lower surface extending along a longitudinal axis between opposite ends and laterally between outer and inner edges. A plurality of mounting projections is molded with and extends laterally from the inner edge. The plurality of mounting projections is securable to the motor vehicle for holding the stepping platform thereagainst. A plurality of reinforcing ribs extends between the lower surface of the stepping platform and the plurality of mounting projections to support the running board as a downward force is applied to said upper surface of said stepping platform.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a top view of the running board;

FIG. 3 is a bottom view of the running board;

DETAILED DESCRIPTION OF THE PREFERRED EMBODIMENT

Figure 1:
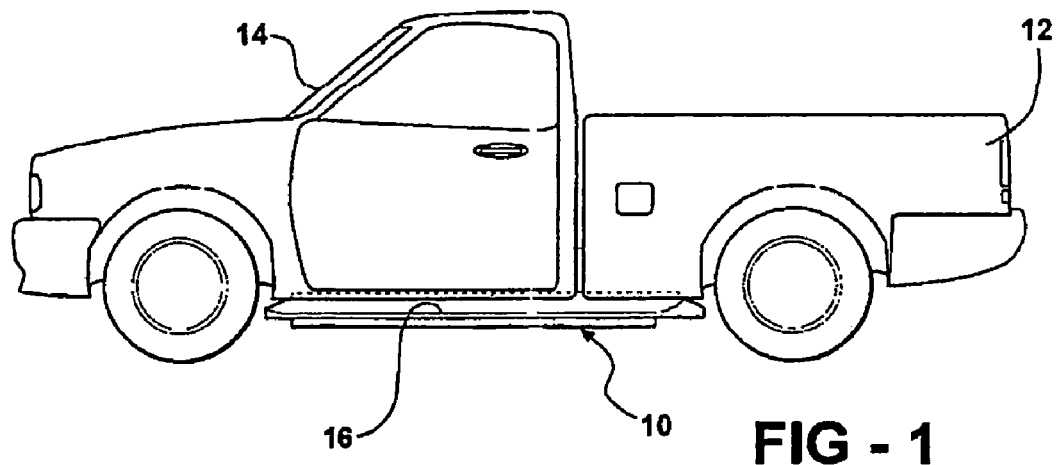
FIG. 1 is a side view of a motor vehicle incorporating a one-piece, integrally molded running board according to one aspect of the invention.
Figure 5:
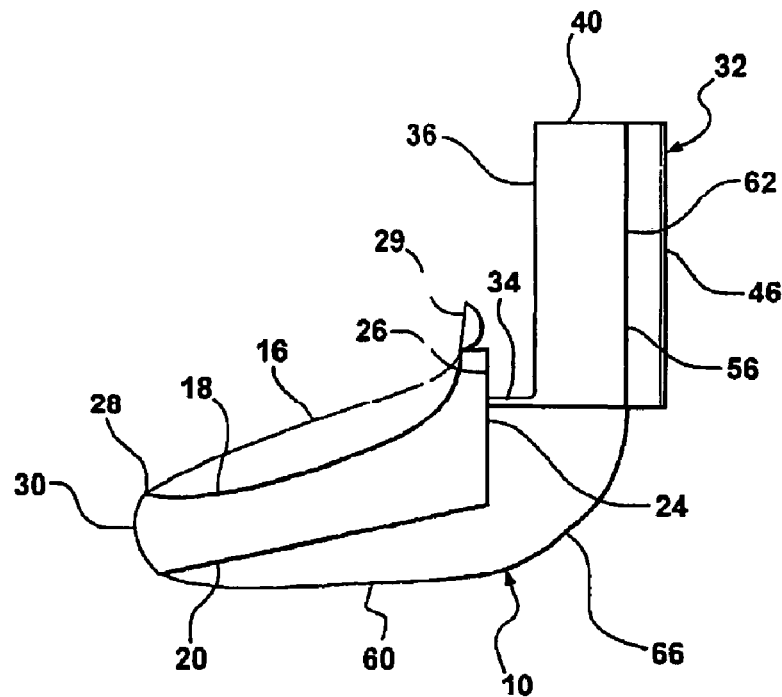
FIG. 5 is an end view of the running board.

Referring to FIG. 1, an integrally molded running board, generally shown at 10, extends longitudinally along a side 12 of a motor vehicle 14. The running board 10 includes a stepping platform 16 for supporting an individual during entering or exiting the motor vehicle 14.

Referring to FIGS. 2–5, the stepping platform 16 includes an upper surface 18 and a lower surface 20 extending between opposite ends 22, 24 along a longitudinal axis. The stepping platform 16 extends laterally between an inner edge 26 and an outer edge 28. A toe wall 29 extends upwardly from the inner edge 26 of the stepping platform 16, and an outer wall 30 extends along the outer edge 28 of the stepping platform 16 between the upper 18 and lower 20 surfaces thereof.

A plurality of mounting projections, generally shown at 32, is integrally molded with the stepping platform 16 and extends laterally from the inner edge 26 thereof. Each of the plurality of mounting projections 32 includes a mounting surface 34 extending laterally from the toe wall 29 for supporting the stepping platform 16 on the motor vehicle 14. In addition, each of the plurality of mounting projections 32 includes a front surface 36 extending upwardly from the mounting surface 34, a back surface 38 opposite to the front surface 36, and a top surface 40 extending between the front 36 and back 38 surfaces. Each of the plurality of mounting projections 32 includes mounting apertures 44 through which a bolt or similar fastener extends to attach the running board 10 to the motor vehicle 14.

Each of the plurality of mounting projections 32 also includes a generally arcuate support beam 46 extending from the back surface 38 to provide additional support to the plurality of mounting projections 32. Each support beam 46 includes an upper beam end 48 and a lower beam end 50. The support beam 46 further includes a recessed area 49 extending between the upper 48 and lower 50 beam ends. It will be appreciated that the support beam 46 is not required to be arcuate shaped; the support beam 46 may have any of a multitude of configurations so long as the chosen configuration provides support to the plurality of mounting projections 32.

Figure 4:
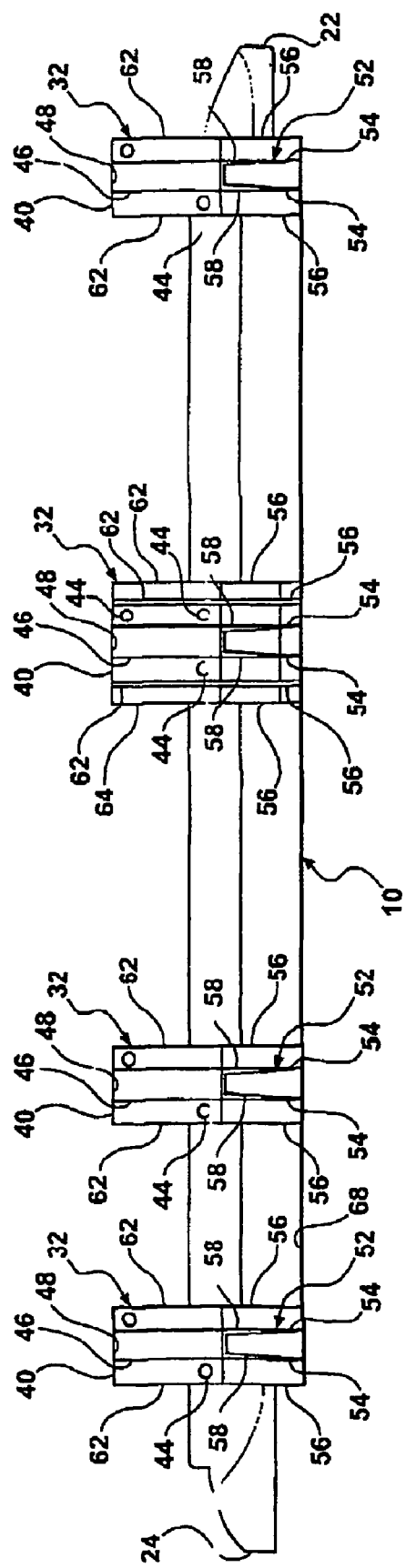
FIG. 4 is a rear view of the running board.

Although four mounting projections are shown in FIGS. 2–4, it is contemplated that more than four or less than four mounting projections may be utilized for the running board 10. FIGS. 2–4 also depict one of the plurality of mounting projections 32 as being larger than the rest of the plurality of mounting projections 32. It is preferred that the larger of the plurality of mounting projections 32 be positioned directly below the area along the stepping platform 16 where an individual is most likely to step during entering or exiting the motor vehicle 14. The shape of each of the plurality of mounting projections 32 is not, however, crucial to the load bearing ability of the running board 10.

The plurality of mounting projections 32 is not necessarily equally spaced apart from one another along the stepping platform 16. It will be appreciated that the plurality of mounting projections 32 may be positioned along the stepping platform 16 in any of a multitude of configurations. For example, the plurality of mounting projections 32 may be equally spaced apart from one another longitudinally along the stepping platform 16.

A plurality of reinforcing ribs, generally indicated at 52, extends between the stepping platform 16 and each of the plurality of mounting projections 32. More particularly, the plurality of reinforcing ribs 52 includes a plurality of spaced apart inner 54 and outer 56 reinforcing ribs. The plurality of inner reinforcing ribs 54 are positioned within the plurality of outer reinforcing ribs 56 along each of the plurality of mounting projections 32.

The plurality of inner reinforcing ribs 54 extends between the support beam 46 of each of the plurality of mounting projections 32 and the lower surface 20 of the stepping platform 16 to provide support for the stepping platform 16. Each of the plurality of inner reinforcing ribs 52 includes a curved upper segment 58 disposed adjacent the lower beam end 50 of the support beam 46, and a lower segment 60 extending laterally below the lower surface 20 of the stepping platform 16 for supporting the stepping platform 16.

The plurality of outer reinforcing ribs 56 extends between the top surface 40 of each of the plurality of mounting projections 32 and the lower surface 20 of the stepping platform 16 to provide support for both the plurality of mounting projections 32 and the stepping platform 16. A portion of the plurality of outer reinforcing ribs 56 extends along the lower surface 20 of the stepping platform 16 and intersects the outer wall 30. Each of the plurality of outer reinforcing ribs 56 includes a vertical segment 62, a horizontal segment 64, and an arcuate segment 66 extending between the vertical 62 and horizontal 64 segments. The vertical segment 62 of each of the plurality of outer reinforcing ribs 56 extends downwardly from the top surface 40 so as to be generally perpendicular to the stepping platform 16. The vertical segment 62 of each of the plurality of outer reinforcing ribs 56 provides support for the plurality of mounting projections 32. The horizontal segment 64 of each of the plurality of outer reinforcing ribs 56 generally extends laterally between the inner 26 and outer 28 edges so as to be transverse to the longitudinal axis. The horizontal segment 64 of each of the plurality of outer reinforcing ribs 56 provides support for the stepping platform 16. The arcuate segments 66 provide an additional load bearing surface. It should be appreciated that the segment interconnecting the vertical 62 and horizontal 64 segments need not be arcuate.

Thus, each one of the plurality of inner 54 and outer 56 reinforcing ribs includes distinct segments for providing support to various portions of the running board 10.

A plurality of longitudinal ribs 68 extends downwardly from the lower surface 20 of the stepping platform 16 to support the stepping platform 16 along the longitudinal axis between the opposite ends 22, 24. Each of the plurality of longitudinal ribs 68 intersects at least a portion of the plurality of reinforcing ribs 52. The plurality of longitudinal ribs 68 may formed to have varying lengths, that is, some of the plurality of longitudinal ribs 68 may be formed to extend only between neighboring mounting projections 32 rather than between the opposite sides 22, 24.

Support ribs 70 extend from the lower surface 20 of the stepping platform 16 to provide additional support thereto. The support ribs 70 extend transverse to the longitudinal axis so as to intersect a portion of the plurality of longitudinal ribs 68. Although two support ribs 70 are shown in FIG. 3, it will be appreciated that any number of support ribs 70 may be formed in association with the running board 10. The support ribs 70 may be formed with varying lengths. In addition, the support ribs 70 may be formed at varying positions along the stepping platform 16.

As downward force is applied to the stepping platform 16, an initial load is borne by the plurality of longitudinal ribs 68. The load is then transferred from the plurality of longitudinal ribs 68 to the plurality of inner 54 and outer 56 reinforcing ribs and, to a lesser extent, to the support ribs 70. The plurality of inner 54 and outer 56 reinforcing ribs transfers the load to the plurality of mounting projections 32 until finally, the load is transferred to the motor vehicle 14 itself. This load transfer allows an initial downward force to be taken off of the stepping platform 16 and shifted to the motor vehicle 14, thus allowing the integrally molded, one-piece running board 10 to withstand the downward force.

The running board 10 is injection molded so that the plurality of mounting projections 32 is integrally molded with the stepping platform 16. Additionally, the running board 10 is molded utilizing a conventional two-piece mold. The reinforcing ribs 52 and mounting projections 32 extend in a mold draw direction to integrally mold both the plurality of mounting projections 32 and the stepping platform 16. Further, the plurality of longitudinal ribs 68 and the support ribs 70 are integrally molded with the stepping platform 16. Thus, the running board 10 is an integral, homogenous, or one-piece member molded of organic polymeric, or plastic material. The chosen material may be reinforced with a filler material including long glass fibres, nano particles, silica, and glass beads.

The combination of the plurality of longitudinal ribs 68 and the plurality of inner 54 and outer 56 reinforcing ribs effectively transfers a load applied upon the stepping platform 16 from the stepping platform 16 to the plurality of mounting projections 32, and finally to the motor vehicle 14. As a result, the one-piece running board 10 withstands a downward force created when an individual steps onto the upper surface 18 of the stepping platform 16.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A one-piece, integrally molded running board adapted to be attached to a motor vehicle, said running board comprising:
    a stepping platform having an upper surface and a lower surface extending along a longitudinal axis between opposite ends and laterally between outer and inner edges;
    a plurality of mounting projections molded with and extending laterally from said inner edge, said plurality of mounting projections securable to the motor vehicle for holding said stepping platform thereagainst;

a plurality of reinforcing ribs extending between said lower surface of said stepping platform and said plurality of mounting projections to support said running board as a downward force is applied to said upper surface of said stepping platform, at least one of said plurality of reinforcing ribs intersecting said outer edge of said stepping platform and;

at least one support rib disposed between and spaced apart from two of said plurality of mounting projections, said at least one support rib extending along said lower surface of said stepping platform at least partially between said outer and inner edges of said stepping platform.

2. A running board as set forth in claim 1 wherein each of said plurality of mounting projections includes a front surface, a rear surface, and a top surface extending therebetween.

3. A running board as set forth in claim 2 wherein said plurality of reinforcing ribs includes a plurality of spaced apart outer reinforcing ribs extending between said lower surface of said stepping platform and said rear surface of each of said plurality of mounting projections.

4. A running board as set forth in claim 3 wherein said plurality of reinforcing ribs includes a plurality of spaced apart inner reinforcing ribs positioned between said plurality of spaced apart outer reinforcing ribs and extending between said lower surface of said stepping platform and said rear surface of each of said plurality of mounting projections.

5. A running board as set forth in claim 4 wherein each of said plurality of mounting projections includes a support beam extending downwardly from said top surface.

6. A running board as set forth in claim 5 wherein each of said plurality of spaced apart inner reinforcing ribs includes a curved upper segment disposed adjacent said support beam.

7. A running board as set forth in claim 6 wherein each of said plurality of spaced apart inner reinforcing beams includes a lower segment extending laterally below said lower surface of said stepping platform to support said stepping platform.

8. A running board as set forth in claim 7 wherein each of said plurality of spaced apart outer reinforcing ribs includes a vertical segment extending downwardly from said top surface of each of said plurality of mounting projections along said rear surface thereof to support said plurality of mounting projections.

9. A running board as set forth in claim 8 wherein each of said plurality of spaced apart outer reinforcing ribs includes a horizontal segment extending below said lower surface of said stepping platform between said inner and outer edges thereof to support said stepping platform.

10. A running board as set forth in claim 9 wherein each of said spaced apart outer reinforcing ribs includes an arcuate segment interconnecting said vertical and horizontal segments to support said running board.

11. A running board as set forth in claim 10 including a plurality of longitudinal ribs extending longitudinally between said opposite ends of said stepping platform to support said stepping platform.

12. A running board as set forth in claim 11 wherein each of said plurality of longitudinal ribs intersects at least one of said plurality of reinforcing ribs.

13. A running board as set forth in claim 12 including a support rib extending from said lower surface of said stepping platform between a portion of said plurality of longitudinal ribs.

14. A running board as set forth in claim 13 wherein said support rib intersects said outer edge of said stepping platform.

15. A running board as set forth in claim 14 wherein said stepping platform includes a toe wall extending upwardly from said inner edge.

16. A running board as set forth in claim 15 wherein each of said plurality of mounting projections includes a mounting surface extending laterally from said toe wall for supporting said stepping platform against the motor vehicle.

17. A running board as set forth in claim 1 wherein said plurality of mounting projections and said reinforcement ribs extend in a die draw direction.

18. A one-piece, integrally molded running board adapted to be attached to a motor vehicle, said running board comprising:

a stepping platform having an upper surface and a lower surface extending along a longitudinal axis between opposite ends and laterally between outer and inner edges;

a plurality of mounting projections molded with and extending laterally from said inner edge, said plurality of mounting projections securable to the motor vehicle for holding said stepping platform thereagainst;

a plurality of reinforcing ribs extending between said lower surface of said stepping platform and said plurality of mounting projections to support said running board as a downward force is applied to said upper surface of said stepping platform; and at least one support rib disposed between and spaced apart from two of said plurality of mounting projections, said at least one support rib extending along said lower surface of said stepping platform at least partially between said outer and inner edges of said stepping platform.

19. A running board as set forth in claim 18 wherein said support rib intersects said outer edge of said stepping platform.

* * * * *